(12) United States Patent
Reitz et al.

(10) Patent No.: US 12,100,059 B2
(45) Date of Patent: Sep. 24, 2024

(54) MACHINE-LEARNING PREDICTION OF OCCUPANCY STATUS OF REAL PROPERTY

(71) Applicant: QUALITY CLAIMS MANAGEMENT CORPORATION, San Diego, CA (US)

(72) Inventors: Ronald R. Reitz, San Diego, CA (US); Robyn Bui, San Diego, CA (US); Badr Shuaib, San Diego, CA (US)

(73) Assignee: Quality Claims Management Corporation, San Diego, CA (US)

( * ) Notice: Subject to any disclaimer, the term of this patent is extended or adjusted under 35 U.S.C. 154(b) by 536 days.

(21) Appl. No.: 17/330,231

(22) Filed: May 25, 2021

(65) Prior Publication Data
US 2021/0374886 A1   Dec. 2, 2021

Related U.S. Application Data

(60) Provisional application No. 63/030,132, filed on May 26, 2020.

(51) Int. Cl.
| | | |
|---|---|---|
| *G06Q 10/00* | (2023.01) | |
| *G06F 18/2113* | (2023.01) | |
| *G06F 18/214* | (2023.01) | |
| *G06F 18/2415* | (2023.01) | |
| *G06N 20/00* | (2019.01) | |
| *G06Q 50/163* | (2024.01) | |

(52) U.S. Cl.
CPC ....... *G06Q 50/163* (2013.01); *G06F 18/2113* (2023.01); *G06F 18/2155* (2023.01); *G06F 18/2415* (2023.01); *G06N 20/00* (2019.01)

(58) Field of Classification Search
CPC .............. G06Q 50/163; G06F 18/2113; G06F 18/2155; G06F 18/2415; G06N 20/00
See application file for complete search history.

(56) References Cited

U.S. PATENT DOCUMENTS

| | | | |
|---|---|---|---|
| 2015/0178865 A1 | 6/2015 | Anderson et al. | |
| 2015/0348187 A1* | 12/2015 | McCarl | G06Q 40/08 705/38 |
| 2016/0048934 A1* | 2/2016 | Gross | G06V 10/40 705/313 |
| 2017/0315697 A1* | 11/2017 | Jacobson | H04L 12/281 |

(Continued)

OTHER PUBLICATIONS

Brownlee, Jason (Why One-Hot Encode Data in Machine Learning? Retrieved at https://web.archive.org/web/20171218065210/https://machinelearningmastery.com/why-one-hot-encode-data-in-machine-learning/) (Year: 2017).*

(Continued)

*Primary Examiner* — Gabrielle A McCormick
(74) *Attorney, Agent, or Firm* — Procopio, Cory, Hargreaves & Savitch LLP

(57) ABSTRACT

Machine-learning prediction of occupancy status of real property. In an embodiment, ground-truth data, comprising property records, are received. The property records are normalized and augmented with property-specific data. Feature vectors, which are labeled with a known occupancy status, are generated from the normalized and augmented property records and used to train a machine-learning model to predict occupancy status based on a plurality of features.

22 Claims, 4 Drawing Sheets

(56) References Cited

U.S. PATENT DOCUMENTS

2018/0225585 A1* 8/2018 Dong ................ G06N 3/04
2019/0180389 A1   6/2019 Hurst et al.

OTHER PUBLICATIONS

IB WIPO, Written Opinion corresponding PCT/US2021/34098, mailed Dec. 8, 2022.
Supplementary European Search Report Mailed Apr. 25, 2024 in European Application No. 21945366, 8 pages.

* cited by examiner

MACHINE-LEARNING PREDICTION OF OCCUPANCY STATUS OF REAL PROPERTY

CROSS-REFERENCE TO RELATED APPLICATIONS

The present application claims priority to U.S. Provisional Patent App. No. 63/030,132, filed on May 26, 2020, which is hereby incorporated herein by reference as if set forth in full.

BACKGROUND

Field of the Invention

The embodiments described herein are generally directed to property datalytics, and, more particularly, to a machine-learning approach to predicting whether real property is occupied or vacant.

Description of the Related Art

For decades, the mortgage servicing and investing industry has relied on the same, legacy process for determining whether real property assets are occupied or vacant, referred to herein as "occupancy status." Determining the occupancy status of properties is critical to the industry, because, when a property becomes vacant, it triggers a duty to preserve and protect the property, impacts various loan and loss mitigation procedures, may require vacant property registration with the city, may require notification to the relevant insurance carrier, and/or the like.

The legacy process generally entails the following:
Day 1: Servicer identifies the list of properties to be monitored for occupancy status.
Day 2-4: Servicer assigns the list of properties to a vendor.
Day 3-5: Servicer uploads the list of properties to the vendor's system for tracking and reporting.
Day 4-6: Vendor orders a physical inspection of each property by a local inspector.
Day 11-13: Local inspector performs physical inspection of each property to determine occupancy status of the property (e.g., occupied, vacant, or unknown/cannot be determined). Indicators that the property is occupied include the presence of an occupant, the presence of personal property, and visual indications of working utilities.
Day 12-15: Local inspector inputs the results of the physical inspections and evidence (e.g., photographs) into the vendor's database.
Day 13-18: Vendor performs quality control process to validate the results of the physical inspections.
Day 14-19: Vendor provides the results of the physical inspections to the servicer in a report format.

This legacy process is generally repeated, for a given client, at a specified frequency, such as every 30-60 calendar days. This repetitive process is currently performed by hundreds of vendors nationwide and faces numerous challenges, such as lack of access within gated communities and condominiums, unknown occupancy statuses during natural disasters, inability to locate the property, lack of training or motivation by the vendors and/or local inspectors, and/or the like. This can lead to inaccurate reporting of occupancy statuses.

Thus, it would be advantageous if the determination of occupancy statuses of real properties could be automated. However, such automation faces significant technological obstacles. For example, data analysis alone cannot emulate the physical inspection process to achieve comparable accuracy in determinations of occupancy status. New technology is required to imbue a computer with artificial intelligence that is sufficient to emulate a physical inspection.

SUMMARY

Accordingly, systems, methods, and non-transitory computer-readable media are disclosed for machine-learning prediction of occupancy status of real property.

In an embodiment, a method is disclosed that comprises using at least one hardware processor to: receive ground-truth data comprising a list of property records representing a plurality of properties, wherein each of the property records comprises a plurality of fields representing a property address and a known occupancy status; generate a list of normalized property records by, for each property record in the list of property records, standardizing one or more of the plurality of fields in the property record; generate a list of augmented property records by, for each normalized property record in the list of normalized property records, retrieve property-specific data from one or more sources based on one or more fields in the normalized property record; generate a dataset of labeled feature vectors by, for each augmented property record in the list of augmented property records, generate a labeled feature vector that is labeled with the known occupancy status in the augmented property record, wherein the labeled feature vector comprises a value for each of a plurality of features, and wherein each of the plurality of features corresponds to one or more fields in the augmented property record; and train a machine-learning model, based on the dataset of labeled feature vectors, to predict an occupancy status based on the plurality of features.

Retrieving property-specific data from one or more sources may comprise querying the one or more sources using on one or more fields representing the property address in the property record. The plurality of fields in each of the property records in the list of property records in the ground-truth data may further represent an identifier of a last-known occupant of the property represented by the property record. Retrieving property-specific data from one or more sources may comprise querying the one or more sources using one or more fields representing the identifier of the last-known occupant of the property represented by the property record. Retrieving property-specific data from one or more sources may comprise retrieving property-specific data from each of a plurality of sources, over at least one network, via an application programming interface (API) provided by each of the plurality of sources.

The plurality of features may comprise one or more categorical features whose values are limited to a fixed number of possible values, wherein the method further comprises using the at least one hardware processor to, when generating each labeled feature vector, for each of the one or more categorical features, convert a value of the categorical feature from an original value, in the augmented property record for which the labeled feature vector is generated, into a one-hot coded or one-cold coded bitmap in the labeled feature vector. The plurality of features may comprise one or more continuous features whose possible values are infinite along a spectrum between two values, wherein the method further comprises using the at least one hardware processor to, when generating each labeled feature vector, for each of the one or more continuous features, convert a value of the continuous feature from an original value, in the augmented property record for which the labeled feature vector is generated, into a value between zero and one in the labeled feature vector.

Training the machine-learning model based on the dataset of labeled feature vectors may comprise: splitting the dataset of labeled feature vectors into a training dataset and a testing dataset; training the machine-learning model using the training dataset; and applying the trained machine-learning model to the labeled feature vectors in the testing dataset to determine an accuracy of the trained machine-learning model. Training the machine-learning model may comprise: training a plurality of machine-learning algorithms based on the dataset of labeled feature vectors; measuring an accuracy of each of the plurality of trained machine-learning algorithms; and deploying one of the plurality of trained machine-learning algorithms having a highest accuracy as the machine-learning model. The machine-learning model may comprise a regression algorithm.

Predicting the occupancy status may comprise outputting a confidence value for at least one of a plurality of classifications of occupancy status. The plurality of classifications of occupancy status may comprise a first classification of occupied and a second classification of vacant. The plurality of classifications of occupancy status may further comprise a third classification of unknown.

The plurality of features may comprise one or more of utility information for a last-known occupant, address information associated with the last-known occupant, an indication that a property has been flagged as vacant, a type of the property, a size of the property, a debt-to-income ratio of the last-known occupant, an income of the last-known occupant, an average price per square foot paid for the property, an amount of mortgage debt on the property, an amount of equity in the property, code violations associated with the property, a first date on which a data point was recorded for the last-known occupant at the property, a last date on which a data point was recorded for the last-known occupant at the property, a date of foreclosure, a number of liens against the property, bankruptcy information associated with the last-known occupant, an indication of whether the last-known occupant is deceased, an age of the last-known occupant, an indication of a fraud alert, a number of records using a same Social Security number as the last-known occupant, or a criminal record of the last-known occupant.

The method may further comprise using the at least one hardware processor to: receive property data comprising a user-specific list of property records representing a plurality of user-specific properties, wherein each of the property records in the user-specific list of property records comprises one or more fields representing a property address; generate a user-specific list of normalized property records by, for each property record in the user-specific list of property records, standardizing at least one of the one or more fields in the property record; and, at each of one or more times, generate a user-specific list of augmented property records by, for each normalized property record in the user-specific list of normalized property records, retrieve property-specific data from one or more sources based on at least one of the one or more fields in the normalized property record, generate a user-specific dataset of feature vectors by, for each augmented property record in the user-specific list of augmented property records, generate a feature vector comprising a value for each of the plurality of features, wherein each of the plurality of features corresponds to one or more fields in the augmented property record, and apply the trained machine-learning model to the user-specific dataset of features to predict the occupancy status for each of the plurality of user-specific properties.

The method may further comprise using the at least one hardware processor to: determine a subset of the plurality of user-specific properties for which the predicted occupancy status is vacant or unknown; and provide the subset to a user. The one or more times may be a plurality of times, and the method may further comprise using the at least one hardware processor to, at a second one of the plurality of times that is subsequent to a first one of the plurality of times: determine a subset of the plurality of user-specific properties for which the predicted occupancy status has changed, since the first time, from occupied to vacant or unknown; and notify the subset to a user. The method may further comprise using the at least one hardware processor to: receive feedback from one or more users, wherein the feedback comprises ground-truth occupancy statuses for at least a subset of the plurality of user-specific properties; generate a new dataset of labeled feature vectors based on the feedback; and re-train the machine-learning model based on the new dataset of labeled feature vectors.

Any of the disclosed methods may be embodied in software modules (e.g., comprising computer-executable instructions) of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for machine-learning prediction of the occupancy status of real property. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
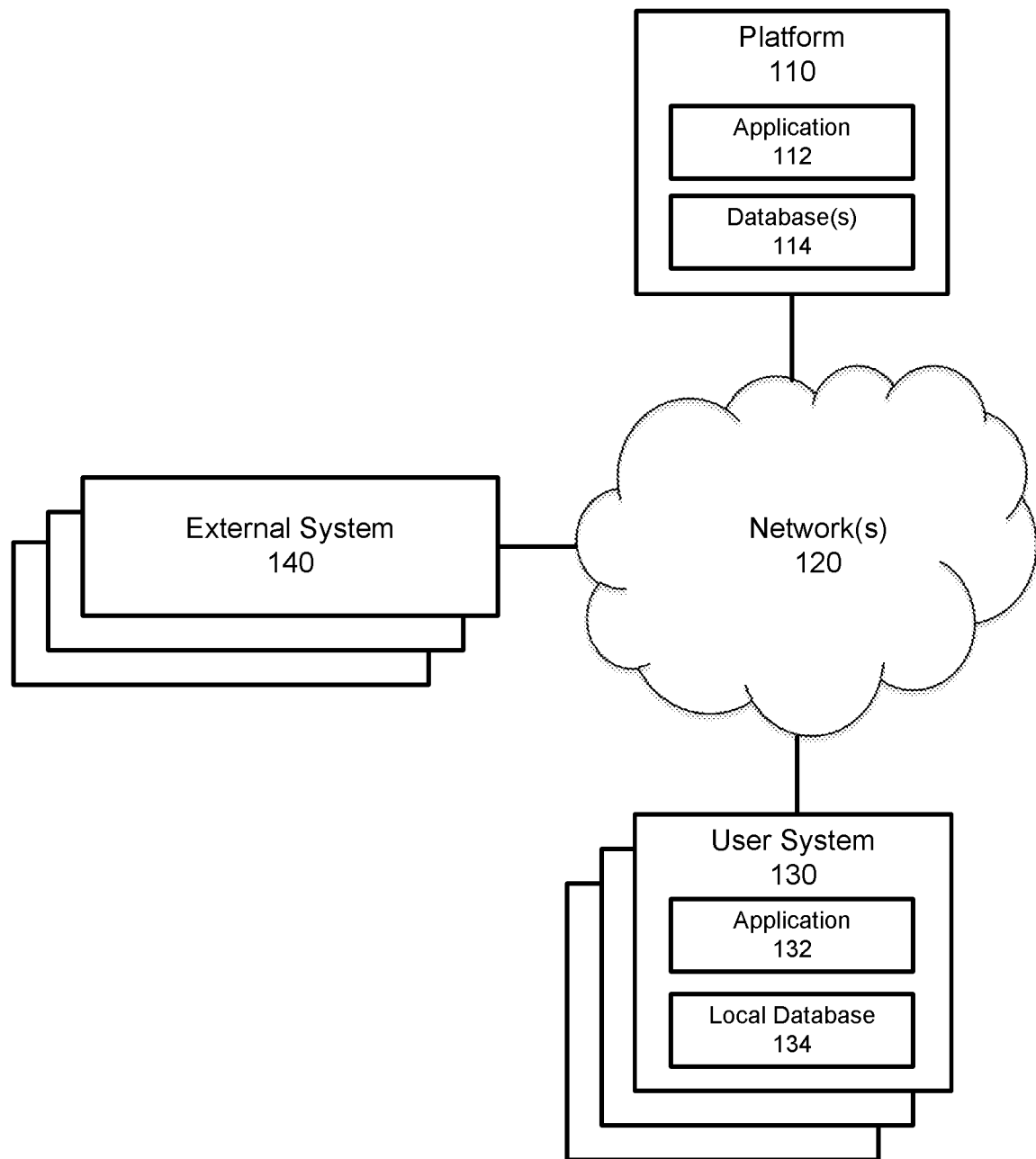
FIG. 1 illustrates an example infrastructure, in which one or more of the processes described herein, may be implemented, according to an embodiment.

FIG. 1 illustrates an example infrastructure for machine-learning prediction of the occupancy status of real property, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that, in a typical embodiment, user system(s) 130 would comprise workstations or personal computers, including desktop, laptop, or tablet computers and/or mobile devices, such as smart phones.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

1.2. Example Processing Device

Figure 2:
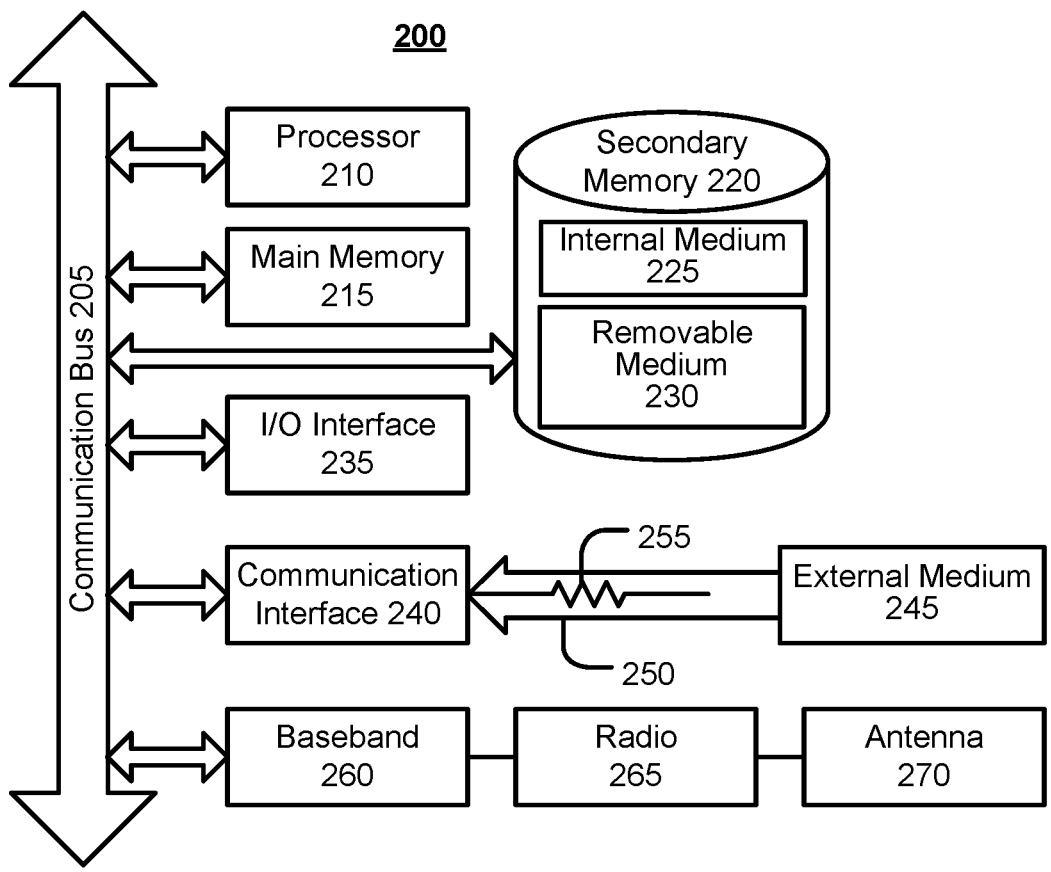
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for machine-learning prediction of occupancy status of real property will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction of Model

In an embodiment, a machine-learning model is used to automate the determination of occupancy statuses for real properties. For example, the machine-learning model may accept a property record as input, and classify the property, represented by the property record, into one of a plurality of classifications. The property record that is input may be a feature vector comprising the values of one or a plurality of features of the property. The machine-learning model may utilize the feature vector to either determine a single one of the plurality of classifications that is most likely to be the correct classification or generate an output vector comprising a value for each of the plurality of classifications, which each value representing the probability or confidence that the property falls into the respective classification. It should be understood that each of the plurality of classifications represents a different one of a plurality of occupancy statuses. For instance, the plurality of classifications may comprise "occupied" (e.g., representing that the property is occupied), "vacant" (e.g., representing that the property is vacant), and "unknown" (e.g., representing that the model could not classify the property into "occupied" or "vacant" with a sufficient level of confidence).

Advantageously, the model may eliminate or reduce the need for physical inspections of properties, with all of the challenges that accompany physical inspections. For instance, the number of physical inspections that are performed can be reduced significantly by only inspecting properties which the model classifies as having an occupancy status of vacant and/or unknown. This can significantly reduce costs for property management, improve the speed of timelines, enable continuous monitoring of occupancy statuses and whereabouts of tenants, eliminate physical constraints, prevent bias in the accuracy of determinations of occupancy statuses, reduce reliance on local vendors, reduce oversight and management of vendors, reduce the number of inaccurate physical inspections, and/or minimize the liability attached to physical inspections of properties.

2.2. Training of Model

Figure 3:
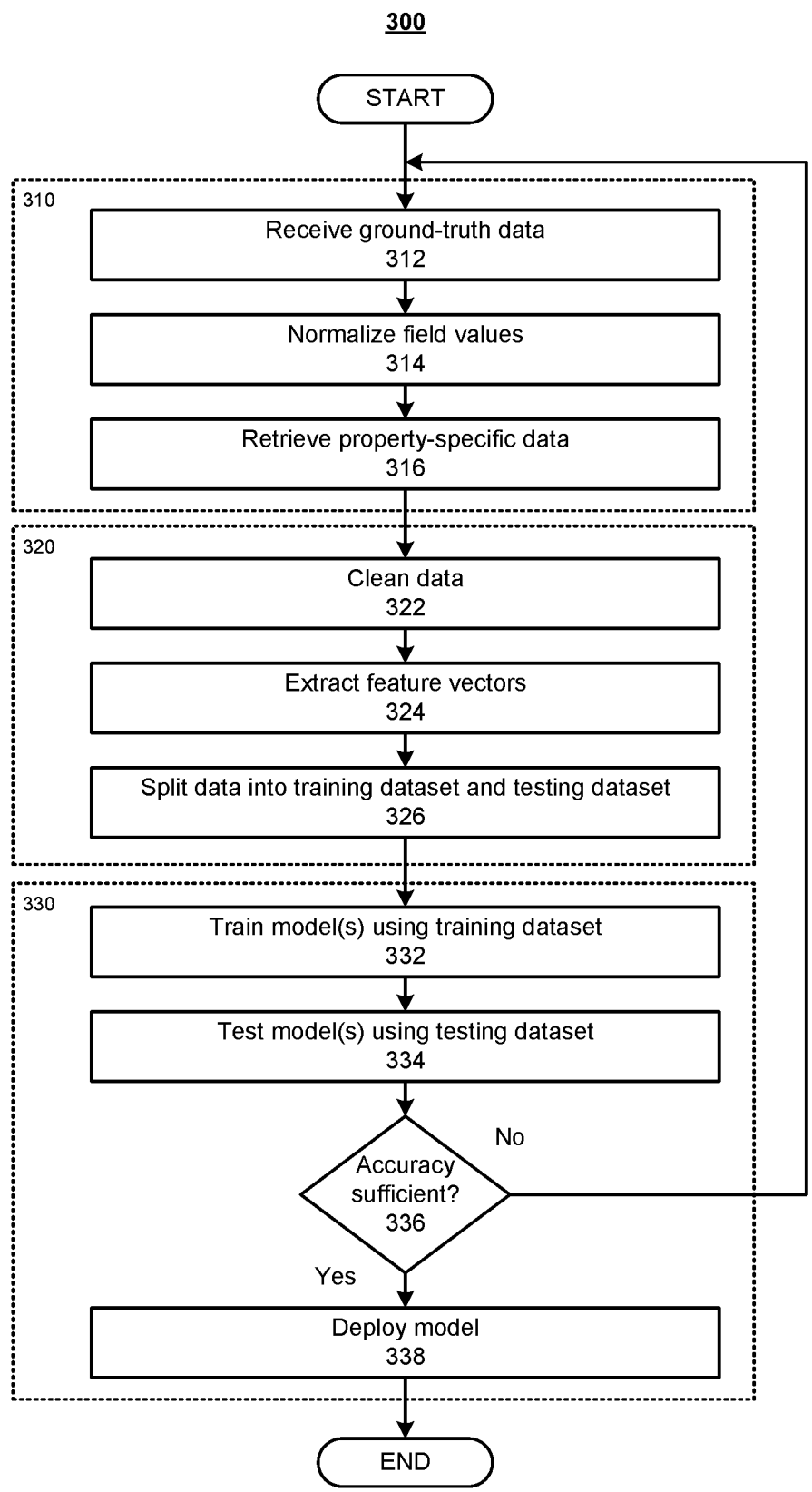
FIG. 3 illustrates an example process for training a machine-learning model, according to an embodiment.

FIG. 3 illustrates an example process 300 for training a machine-learning model, according to an embodiment. Process 300 may be implemented by server application 112 (e.g., as a set of computer-executable instructions stored in a non-transitory computer-readable medium) and executed by processor(s) 210 of platform 110. In an embodiment, process 300 comprises a data-ingestion stage 310, a data-processing stage 320, and a training stage 330.

In subprocess 312 of data-ingestion stage 310, ground-truth data are received. The ground-truth data may be received from a single source or a plurality of different sources. The ground-truth data may comprise a list of a plurality of property records. Each of the plurality of property records may comprise a plurality of fields whose values represent a property address and a known occupancy status. The property address may comprise the street number, street name, city, state, and Zip code of the property, or other unique identifier of the property. The known occupancy status, which represents the ground-truth occupancy status, may comprise a classification of the property as either occupied or vacant. Each of the property records may also comprise one or more fields whose values represent the name (e.g., first name, middle name or initial, and/or last name) and/or other identifier (e.g., Social Security number (SSN), date of birth (DOB)) of the last-known occupant of the property, if known, and/or the name and/or other identifier (e.g., SSN, DOB) of the owner or mortgagor of the property, if known. The ground-truth data represent real properties for which the occupancy status has already been definitively determined, for example, by physical inspection.

In subprocess 314 of data-ingestion stage 310, the ground-truth data, received in subprocess 312, are normalized. In particular, the property addresses, known occupancy statuses, and/or occupant/owner identifiers in the list of property records may be normalized to a standard format. For example, the property addresses may be normalized by eliminating unnecessary spaces in the property address, formatting and/or removing street directions, formatting and/or removing street designations, formatting and/or removing unit designations, and/or the like. The known occupancy statuses may be normalized into standard classifications (e.g., "occupied" and "vacant"). If the occupant/owner identifiers comprise names, the names may be normalized by separating the first, middle, and/or last names, if combined, into separate fields, eliminating unnecessary spaces, capitalizing all letters, and/or the like. If the occupant/owner identifiers comprise SSNs, the SSNs may be normalized by adding leading zeroes if the SSN is less than nine digits, adding or removing hyphens, and/or the like.

In other words, the ground-truth data may be received in subprocess 312 from a plurality of sources in a plurality of different formats or schemas, and may be normalized to a single common format or schema in subprocess 314. Any duplicate property records (e.g., the same property record received from multiple sources) may be removed, so that the list only comprises one property record per property address. The output of subprocess 314 may be a list of normalized property records, with each property record comprising a property address in a standard format, an identifier of the last-known occupant and/or owner in a standard format, and the known occupancy status in a standard format.

In subprocess 316 of data-ingestion stage 310, the list of normalized property records is used to retrieve additional property-specific data. In particular, the property addresses and/or occupant/owner identifiers may be used to query one or more external systems 140 operated by one or more data service providers. For example, the application may interface with each external system 140, over network(s) 120, via an API of the external system 140 to submit a query comprising each of the property addresses and/or occupant/owner identifiers in each of the property records in the normalized list, and receive a result of each query. The queries may be submitted individually or in one or more batches via remote procedure calls provided by the API, depending on the particular submission process supported by the API. If authentication is required for access to a data service via the respective API, the application may perform authentication prior to submitting the queries, for example, using credentials, such as an API key (e.g., stored in database 114).

In this manner, the application may acquire additional property-specific data from a plurality of external systems 140, operated by a plurality of different data service providers. The data services may include any service that enables the retrieval of relevant information based on a property address and/or identifier (e.g., name and/or SSN) of a person, as well as any service that enables the retrieval of relevant information based on information derived from the property address and/or identifier of a person. Different types of property-specific data may be acquired from different service providers, and it should be understood that not all types of property-specific data may be available for all properties and people. Property-specific data may comprise any information that relates to a property or occupant/owner of a property (e.g., square footage of the property, unpaid principal balance of a primary mortgage on the property, unpaid principal balance of a second mortgage on the property, current property value of the property, number of judgments filed against the property, dates of any judgments filed against the property, number of liens of record against the property, etc.), as well as information derived from property-related information.

In an embodiment, the property-specific data, acquired in subprocess 316, comprises occupant-specific data. For a given property, the application may query a data service provider using the identifier (e.g., name and/or SSN) of the last-known occupant and/or owner. Alternatively or additionally, the application may query a data service provider using the property address to acquire an identifier (e.g., name, Social Security number (SSN), etc.) of the last known occupant and/or owner/mortgagor of the property. The application may then query one or more other service providers (or the same service provider if it provides such additional services) using the identity of the last known occupant and/or owner to obtain occupant-specific data. The occupant-specific data may comprise the occupant's and/or owner's aliases, number of names under the same record, gender, date of birth, age, date of death, an indication of whether or not the occupant/owner is deceased, the date on which the occupant/owner was last checked against decedent records, number of children, number of grandchildren, number of great-grandchildren, number of siblings, number of minors in the household, an indication of whether or not the occupant/owner has opted out of data tracking, SSN, number of SSNs, the issue date of the SSN, the place of issue of the SSN, the current address of the occupant/owner, whether or not a change of address was filed by the occupant/owner, the date of any change of address that was filed by the occupant/owner, an indication of whether or not the most recent address of the occupant/owner was deliverable, the date the most recent address was first used by the occupant/owner or seen, the date the most recent address was last used by the occupant/owner or seen, the date the queried property address was first used by the occupant/owner or seen, the date the queried property address was last used by the occupant/owner or seen, the address(es) associated with one or more utilities used by the occupant/owner (e.g., mobile telephone service, landline telephone service, electrical service, gas service, cable or satellite television service, Internet service, water service, etc.), registered occupant or renter name, bankruptcy information (e.g., whether or not a bankruptcy was filed, type of bankruptcy filed, date bankruptcy was filed, whether or not bankruptcy is currently active, etc.), an indication of whether or not an eviction was filed against the occupant or by the owner, a date that an eviction was filed against the occupant or by the owner, federal employer identification number associated with the occupant/owner, the address of the employer of the occupant/owner, annual income, household income, social media address or other identifier of the occupant/owner, geolocation of social media photos associated with the occupant/owner, IP address associated with the occupant/owner, the location mapped to an IP address associated with the occupant/owner, telephone number, email address, location associated with the Zip code of the occupant/owner, vehicle registration records associated with the occupant/owner, driver's license information (e.g., license number, issue date, expiration date, issuing state, address, etc.), records from the Drug Enforcement Administration (DEA) associated with the occupant/owner, number of professional licenses held by the occupant/owner, type of professional license(s) held by the occupant/owner, address of the professional license(s) held by the occupant/owner, incarceration records associated with the occupant/owner, state of incarceration for the occupant/owner, marriage filings associated with the occupant/owner (e.g., date, state, etc.), divorce filings associated with the occupant/owner (e.g., date, state, etc.), voter registration address for the occupant/owner, hunting license address for the occupant/owner, fishing license address for the occupant/owner, total mortgage-debt-to-income ratio of the occupant/owner, total mortgage-debt-to-property-value ratio of the occupant/owner, and/or the like. This information may be acquired not only for the last-known occupant and/or owner/mortgagor of each property, but also for aliases, a known spouse, first degree relatives, and/or known associates of the occupant and/or owner. Notably, some of this occupant-specific data represents the potential current address or other location of the occupant or owner/mortgagor of each property.

It should be understood that the property-specific data pertains to the properties represented in the list of normalized property records. Thus, the property-specific data may be aligned with the list of normalized property records, so as to associate all of the property-specific data that pertain to each property to the property record in the list of normalized property records that represents that property. In other words, each property record is enhanced or augmented with related property-specific data, including data related to the occupant and/or owner/mortgagor of the property. It should be understood that occupant-specific data, as used herein, may refer to data about the last-known occupant, owner, and/or mortgagor, as well as data related to aliases used by the last-known occupant, owner, and/or mortgagor, and spouses and other relatives of the last-known occupant, owner, and/or mortgagor.

In subprocess 322 of data-processing stage 320, all of the property-specific data, including any occupant-specific data, collected for each of the plurality of property records in the list of normalized property records in data-ingestion stage 310, may be parsed, cleaned, and formatted into a usable aggregate dataset. For example, the property-specific data may be acquired as a plurality of disparate datasets in a plurality of different tables and formats from a plurality of different data service providers. All of the disparate property-specific data for a particular property may be reduced into a single property record (e.g., row or array of field values) for that property. In other words, all of the property-specific data may be collapsed into a single list (e.g., represented as a table), in which each entry or row comprises values for all relevant property-specific fields for one of the properties from the list of normalized property records.

Any data that is determined to be unnecessary for training the model may be discarded (e.g., not incorporated into the rows) during this cleaning process. For example, the application may automatically discard any fields that have null or invalid values distributed across a threshold percentage (e.g., 90%) of properties. A high percentage of invalid values indicates that the field will not be able to support a reliable feature for modeling. Thus, the output of subprocess 322 may be a list of clean, augmented property records, in which each property record comprises values for a usable and relevant set of property-specific, including occupant-specific, fields.

In subprocess 324 of data-processing stage 320, a labeled feature vector is extracted for each of the property records in the list of augmented property records output by subprocess 322. In particular, for each of the property records in the list of augmented property records, the values of a subset of the plurality of fields to be used as features are extracted into a feature vector (e.g., an array of the values) for the corresponding property and labeled with the ground-truth occupancy status (e.g., indicating whether the corresponding property is occupied or vacant). Thus, the output of subprocess 324 may be a dataset of labeled feature vectors. It should be understood that the dataset of labeled feature vectors, output by subprocess 324, may correspond one-to-one to the list of augmented property records input from subprocess 322, with each labeled feature vector representing one of the plurality of properties for which data was ingested in data-ingestion stage 310.

The subset of fields to be used as features may be determined using preliminary modeling (e.g., in Python™ or other modeling software). During preliminary modeling, one or more machine-learning algorithms may be used, linear and non-linear relationships between features may be identified and visualized, and correlation matrices may be computed, in order to identify those fields of the property-specific data that have predictive value, and those fields of the property-specific data that do not have predictive value. The fields with predictive value are used as the features that are incorporated into the feature vectors, whereas the fields without predictive value may be discarded or excluded from further processing.

In an embodiment, two types of features are used for modeling: categorial features; and continuous features. Categorical features are those that can only take on a limited, and usually fixed, number of possible values (e.g., age group, income range, etc.). Continuous features are those that can have an infinite number of values along a spectrum between two end values.

For a field that is used as a categorical feature, the value of that field in the property-specific data may be converted to a group of bits using one-hot coding or one-cold coding. One-hot coding creates a group of bits that are all zeroes except for one bit that is one. Each position in the group of bits represents one possible value of the feature, such that collectively the group of bits represents all possible values of the feature, and the one position in the group of bits that is set to one represents the value of the feature among all possible values of the feature. One-cold coding is the same as one-hot coding, except that the group of bits are all ones except for one bit that is zero. In either case, this group of bits or bitmap is what is included as the value in the feature vector for a given categorical feature.

For a field that is used as a continuous feature, the value of that field in the property-specific data may be converted to a value between 0 and 1. It should be understood that the conversion may map values along the spectrum from 0 to 1, such that the relative relationship and proportionality between different values for a feature are maintained. The conversion allows the different values of a feature to be easily compared by the machine-learning model. It should be understood that the converted value between 0 and 1 (inclusive) is what is included as the value in the feature vector for a given continuous feature.

In subprocess 326 of data-processing stage 320, the dataset of labeled feature vectors, output by subprocess 324, is split into a training dataset and a testing dataset. In general, the training dataset should be larger than the testing dataset. For example, the dataset of labeled feature vectors may be split, such that 70% of the labeled feature vectors are included in the training dataset, and 30% of the labeled feature vectors are included in the testing dataset. However, it should be understood that the dataset of labeled feature vectors may be split according to any different ratio. In any case, the split may be stratified to ensure that the training and testing datasets are balanced. In other words, subprocess 326 may comprise interleaving or alternating the selections of the labeled feature vectors from the list of labeled feature vectors, proportionally to the split percentages, when building the training and testing datasets. This ensures that one or both datasets are not disproportionately affected by contiguous blocks of relatively anomalous records that may arise as the ground-truth data are collected from different sources in subprocess 312 or otherwise ordered by intervening subprocesses. The output of subprocess 326 and data-processing stage 320 comprises a training dataset, comprising a plurality of labeled feature vectors, representing a subset of the dataset of labeled feature vectors output by subprocess 324, and a testing dataset, also comprising a plurality of labeled feature vectors, representing another subset of the dataset of labeled feature vectors output by subprocess 324.

In subprocess 332 of training stage 330, one or a plurality of machine-learning models may be trained using the training dataset produced by data-processing stage 320. In an embodiment in which a plurality of machine-learning models are trained, the plurality of machine-learning models may comprise a plurality of different machine-learning algorithms, and/or a plurality of the same machine-learning algorithm but which each use different hyperparameters. Each machine-learning model may comprise a neural network algorithm, random forest algorithm, decision tree algorithm, stacked, boosted, or bagged algorithms, and/or a regression algorithm, such as a linear regression algorithm, a logistic regression algorithm, a neural network regression algorithm, a decision tree regression algorithm, a random forest regression algorithm, or the like. Regression is a type of supervised learning method that maps the feature vectors to a target variable, represented by the label indicating the ground-truth occupancy status. The training may comprise adjusting weights in a statistical equation or nodes in a neural network or decision tree, as well as use one or more optimization algorithms (e.g., gradient descent, Bayesian optimization, genetic algorithms, etc.), so as to minimize an error between the output of the machine-learning algorithm and the ground-truth. In an embodiment, an entropy-based cost function (e.g., cross-entropy) may be used to minimize the error. Each machine-learning algorithm may be trained (e.g., using Python™ libraries or other software) over a plurality of iterations (e.g., more than one-hundred iterations, more than two-hundred iterations, at least a thousand iterations, etc.) to minimize the error, until additional iterations produce no significant improvement in the machine-learning algorithm's accuracy.

In subprocess 334 of training stage 330, each of the machine-learning models, trained in subprocess 332, are applied to the feature vectors in the testing dataset. In other words, the testing dataset is input into each machine-learning model to produce a predicted occupancy status for each feature vector in the testing dataset. The predicted occupancy status may comprise a single classification (e.g., occupied, vacant, or unknown), optionally with an associated confidence value for the classification, or a vector of probability or confidence values for each of the plurality of classifications (e.g., occupied, vacant, and unknown). The predicted occupancy status for each feature vector in the testing dataset can be compared to the label for that feature vector (i.e., representing the ground-truth occupancy status for that feature vector). In the case, that the machine-learning model outputs a vector of confidence values for each of the plurality of classifications, the classification with the highest confidence value may be used as the predicted occupancy status. Alternatively, the classification of occupied is used as the predicted occupancy status only if the associated confidence value exceeds a first threshold value, the classification of vacant is used as the predicted confidence value only if the associated confidence value exceeds a second threshold value (e.g., the same as or different from the first threshold), and the classification of unknown is used if the confidence value of neither the classification of occupied nor the classification of vacant exceeds the respective threshold value. Comparisons of the predicted occupancy statuses to the ground-truth labels in the testing dataset may be used to derive a measure of accuracy for each machine-learning algorithm.

In subprocess 336 of training stage 330, the measure of accuracy for each machine-learning model may be compared to a predefined threshold value of accuracy. The threshold value of accuracy represents a level of accuracy that is sufficient to support deployment of the machine-learning model. If the measure of accuracy for a given machine-learning model is determined to be sufficient (i.e., "Yes" in subprocess 336, e.g., because the measure of accuracy is greater than or equal to the threshold value of accuracy), the machine-learning model may proceed to subprocess 338. Otherwise, if the measure of accuracy for a given machine-learning model is determined to be insufficient (i.e., "No" in subprocess 336, e.g., because the measure of accuracy is less than the threshold value of accuracy), data-ingestion stage 310 and data-processing stage 320 may be re-executed to collect new labeled feature vectors for training and testing, and the machine-learning model may be retrained and retested using the new labeled feature vectors.

However, in an embodiment in which a plurality of machine-learning models is trained and tested, process 300 may proceed to subprocess 338 (i.e., "Yes" in subprocess 336) whenever the measure of accuracy for at least one of the plurality of machine-learning models satisfies the threshold value of accuracy. Conversely, process 300 may re-perform data-ingestion stage 310, data-processing stage 320, and subprocesses 332 and 334 (i.e., "No" in subprocess 336) only when none of the measures of accuracy for the plurality of machine-learning models satisfies the threshold value.

In subprocess 338 of training stage 330, a machine-learning model, whose measure of accuracy satisfies the threshold value, is deployed. In an embodiment in which a plurality of machine-learning models is trained, and in a scenario in which the measures of accuracy for a plurality of machine-learning models satisfies the threshold value, the machine-learning model with the highest measure of accuracy may be deployed in subprocess 338. Otherwise, if the measure of accuracy for only a single machine-learning model satisfies the threshold value, that single machine-learning model may be deployed in subprocess 338. It should be understood that, when a machine-learning model is deployed, the machine-learning model may be applied, in an operation stage, to predict occupancy statuses from property-specific data for properties for which the occupancy status is unknown (e.g., for which no physical inspection or recent physical inspection has been performed).

Process 300 may be repeated periodically as new ground-truth data becomes available. Specifically, when new ground-truth data becomes available, the new ground-truth data may be ingested in data-ingestion stage 310, processed in data-processing stage 320, and used to retrain or further train one or more machine-learning models in training stage 330. Multiple iterations of process 300 may be performed in this manner, as new ground-truth data becomes available, to improve the overall accuracy of the machine-learning model that is deployed and used in the operation stage. In an embodiment, process 300 may be executed in response to receiving an alert from a data service provider that new data is available or there has been a change in the data points in connection with a property or occupant/owner (e.g., new address reported, change in utilities information, etc.). In this case, process 300 may be initiated in response to the alert.

In an embodiment, the machine-learning model that is deployed in subprocess 338 may utilize one or a plurality, including potentially all, of the following features as inputs to make a prediction of occupancy status: utility information (e.g., the address that the last-known occupant used for telephone service, electrical service, gas service, television service, Internet service, water service, etc.); address information (e.g., street number, street address, city, state, and/or Zip code) for the last-known occupant; the name (e.g., first name, middle name, and/or last name) of the last-known occupant; an indication that a property is unoccupied (e.g., as identified by a data service provider); an indication that the United States Postal Service (USPS) has flagged the property as vacant; address information associated with a cellular telephone number of the last-known occupant; address information from a voter registration record of the last-known occupant; address information from licenses (e.g., hunting, fishing, and professional licenses) acquired by the last-known occupant; address information from a vehicle registration of the last-known occupant; the type of property (e.g., condominium, townhouse, or single-family residence); the size of the property (e.g., in square feet); the debt-to-income ratio of the last-known occupant and/or owner of the property; the average income of the last-known occupant and/or owner of the property; the average price per square foot paid for the property; the amount of mortgage debt on the property; the amount of equity in the property; code violations associated with the property; information about phone bills associated with the property; the first date that a data point was recorded for the property and/or last-known occupant at the property; the last date that a data point was recorded for the property and/or last-known occupant at the property; the date a foreclosure was filed on the property; the number of liens against the property; the number of times that the last-known occupant and/or owner has filed bankruptcy; the presence of a bankruptcy filed by the last-known occupant and/or owner; an indication of whether or not the last-known occupant is deceased; an indication of whether or not the occupant/owner of the property is deceased; an indicator of whether or not the last-known occupant is certified Title 10 active duty status; an indicator of whether or not the last-known occupant is a member of the Armed Services or Department of Defense and called to active duty status; the age of the occupant; the age of the owner; whether or not there is a fraud alert on the credit record of the last-known occupant and/or owner or mortgagor; the number of people using the same SSN as the last-known occupant; and a criminal record of the last-known occupant.

In an embodiment, the machine-learning model weights the utilized features according to their relative reliability in determining the current occupancy status of each property. In essence, the machine-learning may utilize the features and weights to determine whether the last-known occupant has relocated or is deceased, thereby leaving the property vacant. For example, if the address-related features indicate an address other than the property address, this may be indicative of the occupant having relocated to the indicated address (e.g., depending on the weights associated with those address-related features, as well as other features).

2.3. Operation of Model

Figure 4:
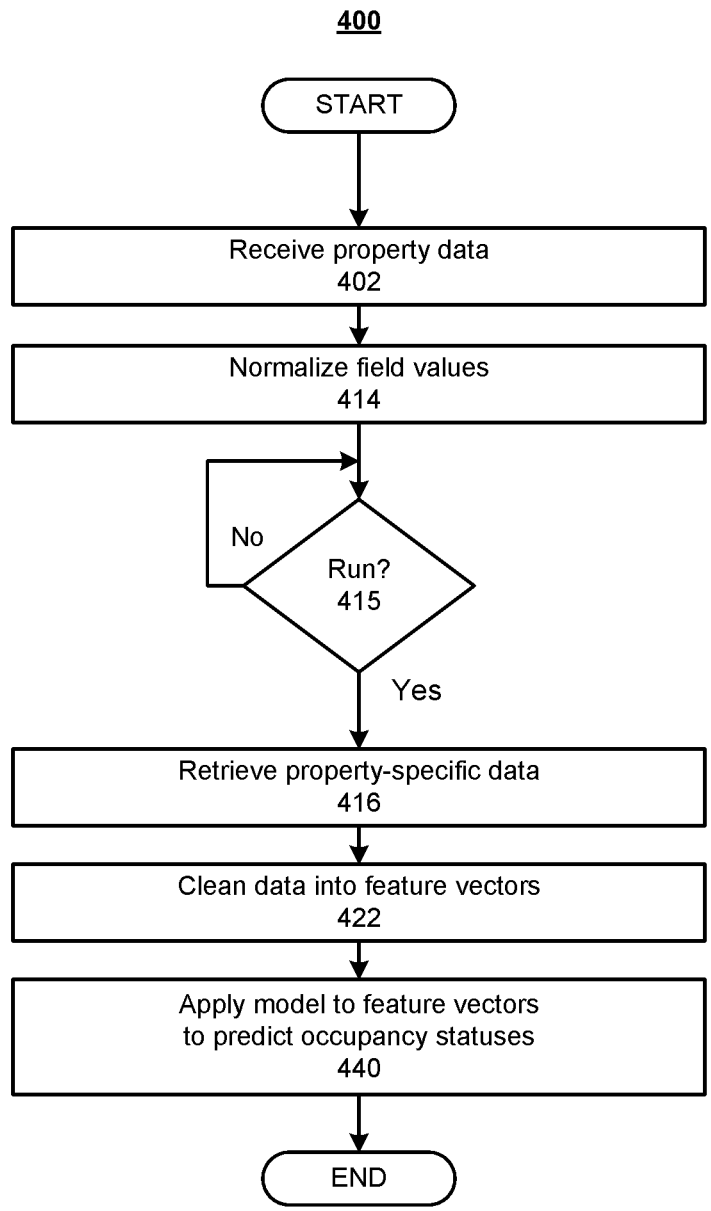
FIG. 4 illustrates an example process for operating a machine-learning model, according to an embodiment.

FIG. 4 illustrates an example process 400 for operating a machine-learning model, according to an embodiment. Process 400 may be implemented by server application 112 (e.g., as a set of computer-executable instructions stored in a non-transitory computer-readable medium) and executed by processor(s) 210 of platform 110. It should be understood that process 400 represents the operation stage of the trained machine-learning model, following deployment in subprocess 338 of process 300.

In subprocess 402, user-provided property data are received. For example, the property data may be uploaded from a user system 130, over network(s) 120, to platform 110, via server application 112. The property data may be uploaded through an API implemented by server application 112 and/or through a graphical user interface generated by server application 112. The property data may comprise a list of a plurality of property records. Each of the plurality of property records may comprise one or more fields whose values represent a property address and/or an identifier of the occupant and/or owner/mortgagor. The property address may comprise the street number, street name, city, state, and Zip code of the property, or other unique identifier of the property. The occupant and/or owner identifier, if provided, may comprise first name, middle name or initial (if available), and last name, and/or an SSN. Essentially, property data may be similar or identical to the ground-truth data, but without ground-truth occupancy statuses, since the occupancy statuses will typically be unknown.

In subprocess 414, the property data, received in subprocess 402, are normalized. In particular, the property addresses and/or occupant/owner identifiers in the list of property records may be normalized to a standard format. For example, the property addresses may be normalized by eliminating unnecessary spaces in the property address, formatting and/or removing street directions, formatting and/or removing street designations, formatting and/or removing unit designations, and/or the like. If the occupant/owner identifiers comprise names, the names may be normalized by separating the first, middle, and/or last names, if combined, into separate fields, eliminating unnecessary spaces, capitalizing all letters, and/or the like. If the occupant/owner identifiers comprise SSNs, the SSNs may be normalized by adding leading zeroes if the SSN is less than nine digits, adding or removing hyphens, and/or the like. Essentially, subprocess 414 may be similar or identical to subprocess 314, except that the property data does not comprise ground-truth occupancy statuses.

In an embodiment that supports continuous monitoring of the occupancy statuses of properties, the property data, received in subprocess 402, may be persistently stored on platform 110 (e.g., in database 114). Thus, occupancy status determinations, using the deployed machine-learning model, may be executed on the stored property data periodically, for example, at predefined intervals (e.g., daily, weekly, etc.). The property data may be persistently stored either before normalization of the property data in subprocess 414 or after the normalization of the property data in subprocess 414. In an embodiment in which the property data are persistently stored before the normalization of the property data in subprocess 414, subprocess 414 will need to be performed each time the machine-learning model is applied, but the original format of the property data will be maintained. On the other hand, in an embodiment in which the property data are persistently stored after the normalization of the property data in subprocess 414, subprocess 414 only needs to be performed once, but the original format of the property data will not be maintained (unless the property data in the original format are also persistently stored).

Whenever it is time to run an occupancy status determination on the stored property data (i.e., "Yes" in subprocess 415), subprocesses 416-440 are executed. As discussed above, the occupancy status determinations may be performed periodically. If it is not yet time to run an occupancy status determination on the stored property data (i.e., "No" in subprocess 415), the application continues to wait until the appropriate time.

In subprocess 416, the list of normalized property records in the property data is used to retrieve additional property-specific data. Subprocess 416 may be similar or identical to subprocess 316 in process 300. Thus, it should be understood that the description of subprocess 316 applies equally to subprocess 416, and will not be redundantly described with respect to subprocess 416. As discussed with respect to subprocess 316, the property-specific data may comprise occupant-specific data (including owner-specific and/or mortgagor-specific data, as well as data for one or more relatives, if known). It should be understood that the property-specific data may comprise values for all the fields that are used a features by the machine-learning model. Accordingly, the property-specific data may comprise values for any of the example features described herein and/or other features not described herein.

In subprocess 422, all of the property-specific data, including any occupant-specific data, collected for each of the plurality of properties in the list of normalized property records in the property data, may be parsed, cleaned, and formatted into a usable aggregate dataset. Subprocess 422 may be similar or identical to subprocess 322 in process 300. Thus, it should be understood that the description of subprocess 322 applies equally to subprocess 422, and will not be redundantly described with respect to subprocess 422. However, the output of subprocess 422 may be a dataset of feature vectors, similar to the output of subprocess 324, but without labels representing the ground-truth occupancy statuses. In other words, subprocess 422 may parse, clean, and format the property-specific data directly into feature vectors, since the features to be used by the machine-learning model are already known by virtue of process 300. Subprocess 422 may do this by extracting only the fields to be used as features from the property-specific data for each property record, and generating a feature vector comprising the values of those extracted fields for each property record. It should be understood that the dataset of feature vectors, output by subprocess 324, may correspond one-to-one to the list of property records in the property data.

In subprocess 440, the machine-learning model, trained and deployed in process 300, is applied to each of the feature vectors in the dataset of feature vectors output by subprocess 422. In particular, for each of the plurality of feature vectors, a trained machine-learning algorithm may process the values of features in the feature vectors to provide a prediction of an occupancy status of the real property represented by the feature vector. The prediction of the occupancy status for a given feature vector may comprise a single one of the plurality of possible classifications (e.g., occupied, vacant, or unknown), optionally with a confidence value for the single classification. Alternatively, the prediction of the occupancy status for a given feature vector may comprise an output vector comprising a confidence value for each and all of the plurality of possible classifications (e.g., occupied, vacant, and unknown), such that the sum of the confidence values for all of the plurality of possible classifications always equals one. In this case, the classification with the highest confidence value may be selected as representing the predicted occupancy status, or the occupancy status may be selected as occupied if the confidence value of the occupied classification is greater than or equal to a threshold value, vacant if the confidence value of the vacant classification is greater than or equal to a threshold value, and unknown if neither the confidence value of the occupied classification nor the confidence value of the vacant classification are greater than or equal to their respective threshold values.

The output of subprocess 440 and process 400 may be a set of occupancy status classifications for each of the properties in the property data. The output may also comprise the property address or other identifier of each property, and a subset of the property-specific data collected for each property. In other words, the output of process 400 may be a list of property records, with each property record in the list representing one property and comprising the property address or other identifier for that property, the occupancy status for that property as predicted in subprocess 440 (e.g., along with a confidence value for the predicted occupancy status), and/or other property-specific data (e.g., a portion or all of the data acquired in subprocess 416). For example, this other property-specific data may comprise an indication of whether or not the last-known occupant and/or owner of the respective property has been identified as deceased and/or the address of the last-known occupant and/or owner of the respective property.

Process 400 may be separately performed for each of a plurality of users of the disclosed application. For example, each of the plurality of users may establish an account with the application (e.g., via a typical account registration process). Once an account has been established, each user may, via a user system 130, authenticate with the application (e.g., by entering credentials, such as a username and password, into a graphical user interface of the application, by providing an API key to the API of the application, etc.), and upload property data in subprocess 402. User accounts may be provided in any known manner, including with a plurality of different user accounts under a single enterprise account, with different permissions and/or roles within the enterprise account. Users may modify their associated property data as needed or desired, for example, to add property records, delete property records (e.g., if the occupancy status is determined definitively via physical inspection or by occupant notification), update property records, and/or the like.

The output of process 400 may be provided to the associated user via a graphical user interface of the application, via an API to an external system 140, via an electronic file downloaded to a user system, and/or the like. For example, the user may log in through a graphical user interface to view the predicted occupancy statuses for one or more properties (e.g., in a dashboard, using search, sorting, and/or filtering tools) and/or download an electronic file (e.g., spreadsheet, comma-delimited file, Portable Document Format (PDF) file, etc.) comprising property records, each comprising a property identifier (e.g., the address or another unique identifier) and the predicted occupancy status. Alternatively, property records, each comprising a property identifier (e.g., the address or another unique identifier) and the predicted occupancy status, may be pushed by the application to an external system 140 (e.g., maintained by the user's enterprise) via an API of the external system 140, or pulled by the external system 140 from the application using an API of the application.

As mentioned above, the property records associated with a given user may be periodically evaluated by process 400 to determine occupancy statuses for each of the represented properties. In an embodiment, the application may alert or otherwise notify the user each time the occupancy status of a property, determined in a current evaluation, changes from a prior occupancy status determined by a prior evaluation. It should be understood that the change may be from any one classification to any different classification (e.g., occupied to vacant, occupied to unknown, vacant to occupied, vacant to unknown, unknown to occupied, and unknown to vacant). Alternatively, the application may only notify the user when the occupancy status of a property changes to vacant and/or unknown, and may optionally stop monitoring a property whose occupancy status is vacant or unknown after notifying the user. In any case, the notification may be provided in the same manner as described above (e.g., via a graphical user interface, via an API, via an electronic file, etc.).

Notably, process 400 enables a user to significantly reduce the number of physical inspections that must be performed for properties managed by the user. For example, the user may only initiate physical inspections for those properties that the application identifies, via the predictions of occupancy statuses by the machine-learning model, as vacant and/or unknown. The user may choose to forego physical inspections for those properties which the application identifies as occupied.

In an embodiment, a user may provide feedback when the user has definitively determined that a property is occupied or vacant. The definitive determination of occupancy status may be the result of a physical inspection or a notification from the occupant. This feedback may be incorporated into a new training dataset to be used in a new training stage 330 to improve the accuracy of the machine-learning model. For example, the property-specific data for such properties may be collected as discussed with respect to subprocess 316, the data may be cleaned as discussed with respect to subprocess 322, and the feature vectors may be extracted as discussed with respect to subprocess 324. These feature vectors may be labeled with the newly learned ground-truth occupancy statuses, and split into training and testing datasets for execution of training stage 330.

3. Example Use Case

In one particular use case, an investor or servicer may utilize the application for default-loan servicing. For example, the investor or servicer may establish an account with the application. A user of the account may generate a list of properties that includes all loans that are delinquent by at least thirty days, on an external system 140 (e.g., a loan servicing application managed and operated by the investor or servicer or a third party) or on platform 110 (e.g., if platform 110 supports a broader application that provides loan servicing).

This list of properties may be provided to process 400 of the application to initiate subprocess 402. For example, if the list of properties is generated on an external system 140, the list may be uploaded to platform 110 (e.g., by HTTPS via a graphical user interface provided for the user's account with the application, via FTPS to a folder associated with the user's account using an FTP client, etc.) or may be communicated by external system 140 to the application executing on platform 110 via an API provided by the application. If through an API, external system 140 may authenticate with the application (e.g., using an API key), and then utilize a remote procedure call of the API to transmit an electronic batch file comprising the list of properties. Alternatively, the user could email or otherwise communicate the list of properties to an email address associated with the application or an operator of the application. If the list of properties is generated on platform 110 itself, the list may simply be passed to a software module implementing process 400 via an inter-process communication.

Once the list of properties has been received, the application may execute process 400 to apply the deployed machine-learning model, in an operation stage, to the list of properties, as discussed elsewhere herein, to classify each of the properties in the list into a category of occupancy status. The application may package the results of the classification into a list of property records that each comprises, for a respective property, the property address, the predicted occupancy status (e.g., occupied, vacant, or unknown), a confidence value of the occupancy status (e.g., on a scale of 0 to 1, with 0 representing no confidence and 1 representing complete confidence), and optionally other property-specific data, such as the name of the last-known occupant/owner, a deceased indicator if the last-known occupant/mortgagor has been identified as deceased and/or the most current address associated with the last-known occupant/mortgagor if available.

Any of the properties in the list of property records, output by process 400, that have been classified as occupied, may be persistently stored in database 114, so that process 400 may be periodically executed to re-apply the machine-learning model to the property records. These property records may be maintained by the application and periodically re-classified by process 400 until they are classified as vacant or unknown. Once a property record has been classified as vacant or unknown, it may be deleted from persistent storage in database 114, so that it is no longer periodically re-classified by process 400. In other words, the machine-learning model is continually applied to all of the property records that have been classified as occupied until their classification changes to vacant or unknown.

Alternatively, all of the properties in the list of property records may be continually monitored for changes in occupancy status until the user explicitly dis-enrolls the respective property record from monitoring. In this case, the user may select individual or groups of property records (e.g., filtered by occupancy status) to enroll and/or dis-enroll the selected property record(s) from monitoring using one or more inputs of a graphical user interface generated by the application for the user's account. The user may also add new records and/or delete existing property records, edit existing property records, and/or the like, via the graphical user interface. The application may notify the user of any change in the predicted occupancy status for any of the property records after each application of the machine-learning model to the property records.

Any of the properties that are classified as vacant or unknown, either during the initial execution of process 400 or during a periodic execution of process 400, may be notified to the user (e.g., within a graphical user interface of the application, via export of the property records to external system 140 via an API of external system 140, via import of the property records from platform 110 via an API of the application, via email message, etc.). The user may then order a physical inspection of each property, for which the occupancy status has been classified as vacant or unknown, to confirm whether or not the property is vacant. Accordingly, the user can initiate preservation efforts for any property that is confirmed to be vacant by physical inspection.

The user may provide feedback for each property that is confirmed to be vacant or occupied by physical inspection, to be used as new ground-truth data in a subsequent execution of process 300. For example, the user could upload a list of property records, comprising the property address for each property and the known occupancy status for each property. These property records can be used by themselves or packaged with other feedback from other users and/or other ground-truth data from other data sources to produce new training and testing datasets, in process 300, for improving the accuracy of the machine-learning model.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
  receive ground-truth data comprising a list of property records representing a plurality of properties, wherein each of the property records comprises a plurality of fields representing a property address and a known occupancy status;
  generate a list of normalized property records by, for each property record in the list of property records, standardizing one or more of the plurality of fields in the property record;
  generate a list of augmented property records by, for each normalized property record in the list of normalized property records, retrieve property-specific data from one or more sources based on one or more fields in the normalized property record;
  generate a dataset of labeled feature vectors by, for each augmented property record in the list of augmented property records, generate a labeled feature vector that is labeled with the known occupancy status in the augmented property record, wherein the labeled feature vector comprises a value for each of a plurality of features, wherein each of the plurality of features corresponds to one or more fields in the augmented property record, and wherein the plurality of features comprises a first date on which a data point was recorded for a last-known occupant at a property, a last date on which a data point was recorded for the last-known occupant at the property, a debt-to-income ratio of the last-known occupant, an amount of mortgage debt on the property, and code violations associated with the property; and
  train a machine-learning model, based on the dataset of labeled feature vectors, to predict an occupancy status based on the plurality of features.

2. The method of claim 1, wherein retrieving property-specific data from one or more sources comprises querying the one or more sources using on one or more fields representing the property address in the property record.

3. The method of claim 1, wherein the plurality of fields in each of the property records in the list of property records in the ground-truth data further represent an identifier of a last-known occupant of the property represented by the property record.

4. The method of claim 3, wherein retrieving property-specific data from one or more sources comprises querying the one or more sources using one or more fields representing the identifier of the last-known occupant of the property represented by the property record.

5. The method of claim 1, wherein retrieving property-specific data from one or more sources comprises retrieving property-specific data from each of a plurality of sources, over at least one network, via an application programming interface (API) provided by each of the plurality of sources.

6. The method of claim 1, wherein the plurality of features comprises one or more categorical features whose values are limited to a fixed number of possible values, and wherein the method further comprises using the at least one hardware processor to, when generating each labeled feature vector, for each of the one or more categorical features, convert a value of the categorical feature from an original value, in the augmented property record for which the labeled feature vector is generated, into a one-hot coded or one-cold coded bitmap in the labeled feature vector.

7. The method of claim 1, wherein the plurality of features comprises one or more continuous features whose possible values are infinite along a spectrum between two values, and wherein the method further comprises using the at least one hardware processor to, when generating each labeled feature vector, for each of the one or more continuous features, convert a value of the continuous feature from an original value, in the augmented property record for which the labeled feature vector is generated, into a value between zero and one in the labeled feature vector.

8. The method of claim 1, wherein training the machine-learning model based on the dataset of labeled feature vectors comprises:
  splitting the dataset of labeled feature vectors into a training dataset and a testing dataset;
  training the machine-learning model using the training dataset; and
  applying the trained machine-learning model to the labeled feature vectors in the testing dataset to determine an accuracy of the trained machine-learning model.

9. The method of claim 1, wherein training the machine-learning model comprises:
  training a plurality of machine-learning algorithms based on the dataset of labeled feature vectors;
  measuring an accuracy of each of the plurality of trained machine-learning algorithms; and
  deploying one of the plurality of trained machine-learning algorithms having a highest accuracy as the machine-learning model.

10. The method of claim 1, wherein the machine-learning model comprises a regression algorithm.

11. The method of claim 1, wherein predicting the occupancy status comprises outputting a confidence value for at least one of a plurality of classifications of occupancy status.

12. The method of claim 11, wherein the plurality of classifications of occupancy status comprises a first classification of occupied and a second classification of vacant.

13. The method of claim 12, wherein the plurality of classifications of occupancy status further comprises a third classification of unknown.

14. The method of claim 1, wherein the plurality of features further comprises one or more of utility information for the last-known occupant, address information associated with the last-known occupant, an indication that the property has been flagged as vacant, a type of the property, a size of the property, an income of the last-known occupant, an average price per square foot paid for the property, an amount of equity in the property, a date of foreclosure, a number of liens against the property, bankruptcy information associated with the last-known occupant, an indication of whether the last-known occupant is deceased, an age of the last-known occupant, an indication of a fraud alert, a number of records using a same Social Security number as the last-known occupant, or a criminal record of the last-known occupant.

15. The method of claim 1, further comprising using the at least one hardware processor to:
  receive property data comprising a user-specific list of property records representing a plurality of user-specific properties, wherein each of the property records in the user-specific list of property records comprises one or more fields representing a property address;
  generate a user-specific list of normalized property records by, for each property record in the user-specific list of property records, standardizing at least one of the one or more fields in the property record; and,
  automatically, at each of one or more times, generate a user-specific list of augmented property records by, for each normalized property record in the user-specific list of normalized property records, retrieve property-specific data from one or more sources based on at least one of the one or more fields in the normalized property record, generate a user-specific dataset of feature vectors by, for each augmented property record in the user-specific list of augmented property records, generate a feature vector comprising a value for each of the plurality of features, wherein each of the plurality of features corresponds to one or more fields in the augmented property record, and apply the trained machine-learning model to the user-specific dataset of features to predict the occupancy status for each of the plurality of user-specific properties.

16. The method of claim 15, further comprising using the at least one hardware processor to:
determine a subset of the plurality of user-specific properties for which the predicted occupancy status is vacant or unknown; and
provide the subset to a user.

17. The method of claim 15, wherein the one or more times are a plurality of times, and wherein the method further comprises using the at least one hardware processor to, at a second one of the plurality of times that is subsequent to a first one of the plurality of times:
determine a subset of the plurality of user-specific properties for which the predicted occupancy status has changed, since the first time, from occupied to vacant or unknown; and
notify the subset to a user.

18. The method of claim 15, further comprising using the at least one hardware processor to:
receive feedback from one or more users, wherein the feedback comprises ground-truth occupancy statuses for at least a subset of the plurality of user-specific properties;
generate a new dataset of labeled feature vectors based on the feedback; and
re-train the machine-learning model based on the new dataset of labeled feature vectors.

19. The method of claim 1, wherein the plurality of features further comprises utility information for the last-known occupant.

20. The method of claim 1, wherein the plurality of features further comprises address information associated with the last-known occupant.

21. A system comprising:
at least one hardware processor; and
one or more software modules comprising computer-executable instructions that are configured to, when executed by the at least one hardware processor,
receive ground-truth data comprising a list of property records representing a plurality of properties, wherein each of the property records comprises a plurality of fields representing a property address and a known occupancy status,
generate a list of normalized property records by, for each property record in the list of property records, standardizing one or more of the plurality of fields in the property record,
generate a list of augmented property records by, for each normalized property record in the list of normalized property records, retrieve property-specific data from one or more sources based on one or more fields in the normalized property record,
generate a dataset of labeled feature vectors by, for each augmented property record in the list of augmented property records, generate a labeled feature vector that is labeled with the known occupancy status in the augmented property record, wherein the labeled feature vector comprises a value for each of a plurality of features, wherein each of the plurality of features corresponds to one or more fields in the augmented property record, and wherein the plurality of features comprises a first date on which a data point was recorded for a last-known occupant at a property, a last date on which a data point was recorded for the last-known occupant at the property, a debt-to-income ratio of the last-known occupant, an amount of mortgage debt on the property, and code violations associated with the property, and
train a machine-learning model, based on the dataset of labeled feature vectors, to predict an occupancy status based on the plurality of features.

22. A non-transitory computer-readable medium having instructions stored therein, wherein the instructions, when executed by a processor, cause the processor to:
receive ground-truth data comprising a list of property records representing a plurality of properties, wherein each of the property records comprises a plurality of fields representing a property address and a known occupancy status;
generate a list of normalized property records by, for each property record in the list of property records, standardizing one or more of the plurality of fields in the property record;
generate a list of augmented property records by, for each normalized property record in the list of normalized property records, retrieve property-specific data from one or more sources based on one or more fields in the normalized property record;
generate a dataset of labeled feature vectors by, for each augmented property record in the list of augmented property records, generate a labeled feature vector that is labeled with the known occupancy status in the augmented property record, wherein the labeled feature vector comprises a value for each of a plurality of features, wherein each of the plurality of features corresponds to one or more fields in the augmented property record, and wherein the plurality of features comprises a first date on which a data point was recorded for a last-known occupant at a property, a last date on which a data point was recorded for the last-known occupant at the property, a debt-to-income ratio of the last-known occupant, an amount of mortgage debt on the property, and code violations associated with the property; and
train a machine-learning model, based on the dataset of labeled feature vectors, to predict an occupancy status based on the plurality of features.

\* \* \* \* \*